United States Patent
Sudbrink et al.

(10) Patent No.: US 9,585,300 B2
(45) Date of Patent: Mar. 7, 2017

(54) FOLDING AGRICULTURAL IMPLEMENT HINGE SYSTEM

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 67 days.

(21) Appl. No.: 14/533,377

(22) Filed: Nov. 5, 2014

(65) Prior Publication Data

US 2015/0129263 A1 May 14, 2015

Related U.S. Application Data

(60) Provisional application No. 61/903,466, filed on Nov. 13, 2013.

(51) Int. Cl.
*A01B 73/04* (2006.01)

(52) U.S. Cl.
CPC .................................. *A01B 73/046* (2013.01)

(58) Field of Classification Search
CPC ...... A01B 73/04; A01B 73/044; A01B 73/046
USPC ................................................. 172/311, 459
See application file for complete search history.

(56) References Cited

U.S. PATENT DOCUMENTS

| 4,116,282 A | * | 9/1978 | Hansen | A01B 73/044 |
| | | | | 172/311 |
| 4,561,505 A | * | 12/1985 | Williamson | A01B 73/044 |
| | | | | 16/242 |
| 4,878,545 A | * | 11/1989 | Dyken | A01B 73/04 |
| | | | | 172/311 |
| 8,505,645 B1 | * | 8/2013 | Kelly | A01B 73/046 |
| | | | | 172/311 |
| 8,776,908 B2 | * | 7/2014 | Maro | A01B 73/046 |
| | | | | 172/311 |
| 2015/0129253 A1 | * | 5/2015 | Sudbrink | A01B 73/046 |
| | | | | 172/1 |

* cited by examiner

*Primary Examiner* — Gary Hartmann
(74) *Attorney, Agent, or Firm* — Rebecca L. Henkel; Rickard K. DeMille

(57) ABSTRACT

A folding agricultural implement including a plurality of tilling sections and a hinge system. The tilling sections include first and second tilling sections, with the second tilling section being pivotally coupled to the first tilling section about a first pivot axis. The hinge is system coupled to both tilling sections. The hinge system includes a link, an actuator, at least one wheel and a ramp system. The link is pivotally coupled to the first tilling section about a second pivot axis. The actuator has a pivoting connection on each end with one pivoting connection being coupled to the second tilling section and the other pivoting connection is coupled to the link, with the actuator having a range of travel. The wheel is rotationally coupled to the link. The ramp system is configured for the wheel to traverse thereover for a portion of the range of travel of the actuator.

20 Claims, 10 Drawing Sheets

FOLDING AGRICULTURAL IMPLEMENT HINGE SYSTEM

CROSS REFERENCE TO RELATED APPLICATIONS

This is a non-provisional application based upon U.S. provisional patent application Ser. No. 61/903,466, entitled "FOLDING AGRICULTURAL IMPLEMENT HINGE SYSTEM", filed Nov. 13, 2013, which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements may include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As tillage implements become wider and wider over time, it becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators. It is also desirable for the tillage implement to remain within certain geometric constraints so that it is not necessary to use a separate "escort vehicle" or the like when traveling on public roads.

Particular hinging issues arise when large objects are folded. As here when wing sections are folded significant shifts in weight occur about the pivot axis.

What is needed in the art is an agricultural implement which can fold, using hinge systems that can handle even a triple-fold configuration with a wide operating width, e.g., greater than 50 feet, while still being folded remotely to a compact transport position.

SUMMARY OF THE INVENTION

The present invention provides a folding field cultivator which uses an elevated hinge system to enable the cultivator to be folded into a compact transport position.

The invention in one form is directed to a folding agricultural implement including a plurality of tilling sections and a hinge system. The tilling sections include first and second tilling sections, with the second tilling section being pivotally coupled to the first tilling section about a first pivot axis. The hinge is system coupled to both tilling sections. The hinge system includes a link, an actuator, at least one wheel and a ramp system. The link is pivotally coupled to the first tilling section about a second pivot axis. The actuator has a pivoting connection on each end with one pivoting connection being coupled to the second tilling section and the other pivoting connection is coupled to the link, with the actuator having a range of travel. The wheel is rotationally coupled to the link. The ramp system is configured for the wheel to traverse thereover for a portion of the range of travel of the actuator.

The invention in another form is directed to a hinge system for a folding agricultural implement having a plurality of tilling sections. The tilling sections include first and second tilling sections, with the second tilling section being pivotally coupled to the first tilling section about a first pivot axis. The hinge is system coupled to both tilling sections. The hinge system includes a link, an actuator, at least one wheel and a ramp system. The link is pivotally coupled to the first tilling section about a second pivot axis. The actuator has a pivoting connection on each end with one pivoting connection being coupled to the second tilling section and the other pivoting connection is coupled to the link, with the actuator having a range of travel. The wheel is rotationally coupled to the link. The ramp system is configured for the wheel to traverse thereover for a portion of the range of travel of the actuator.

The present invention advantageously allows for the folding of the implement into a small enough package that it can be transported on a road without special permits.

Another advantage of the present invention is that the hinge system accommodates the weight shift of the tillage sections for the compact folding of the implement.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
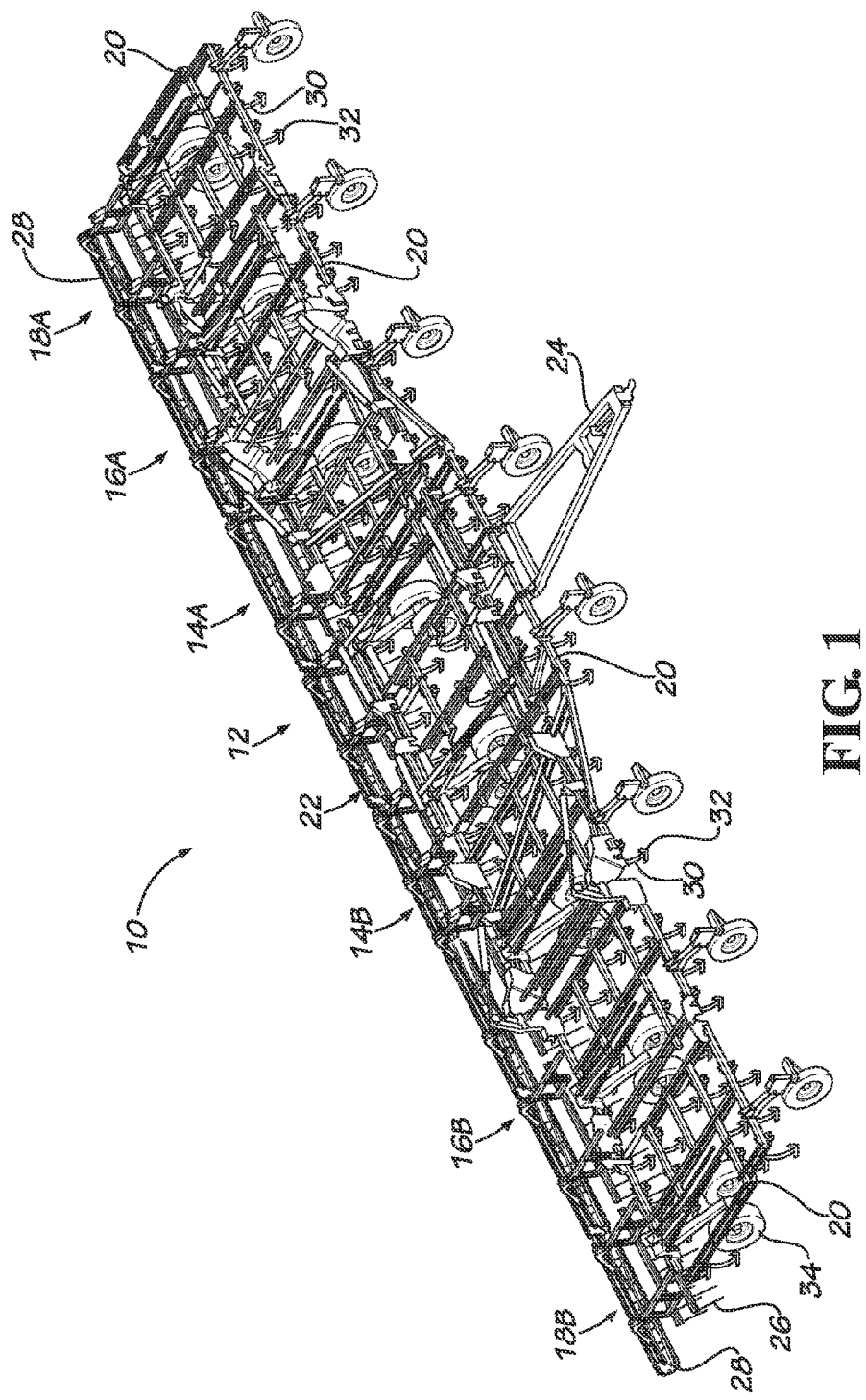
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of an agricultural implement of the present invention. In the illustrated embodiment, the agricultural implement is in the form of a field cultivator 10 for tilling and finishing soil prior to seeding. However, the present invention may be used with other types of agricultural implements such as air seeders, planters, etc.

Field cultivator 10 is configured as a multi-section field cultivator, and includes a center frame section 12 and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20 of center frame section 12, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 2:
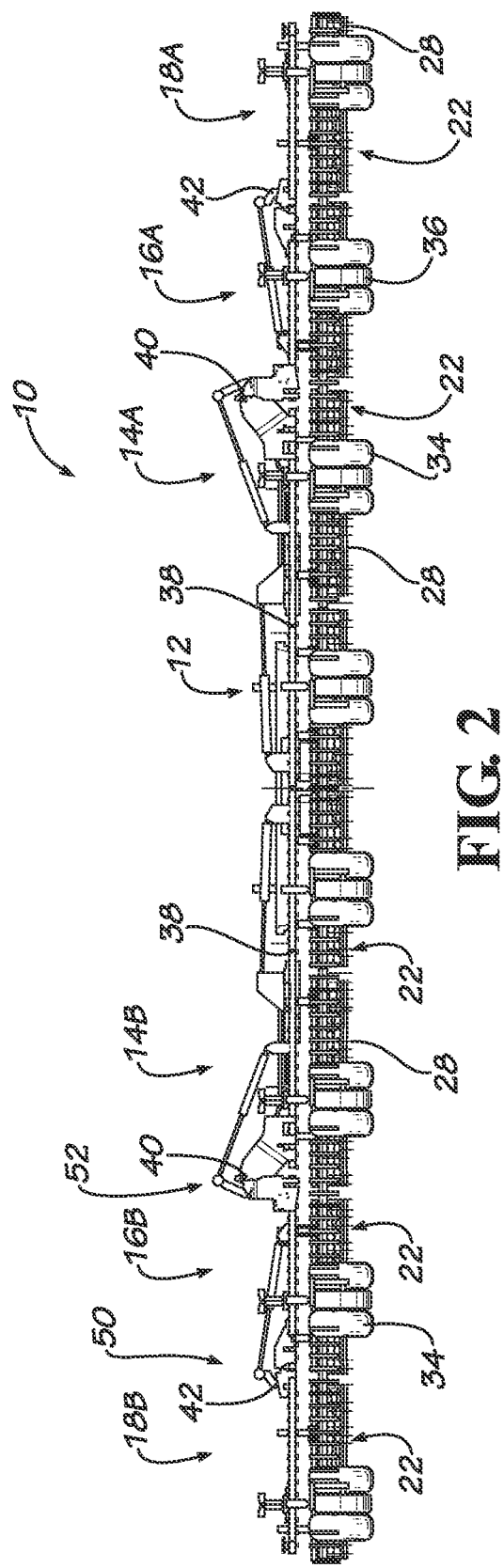
FIG. 2 is a front view of the field cultivator shown in FIG. 1.
Figure 3:
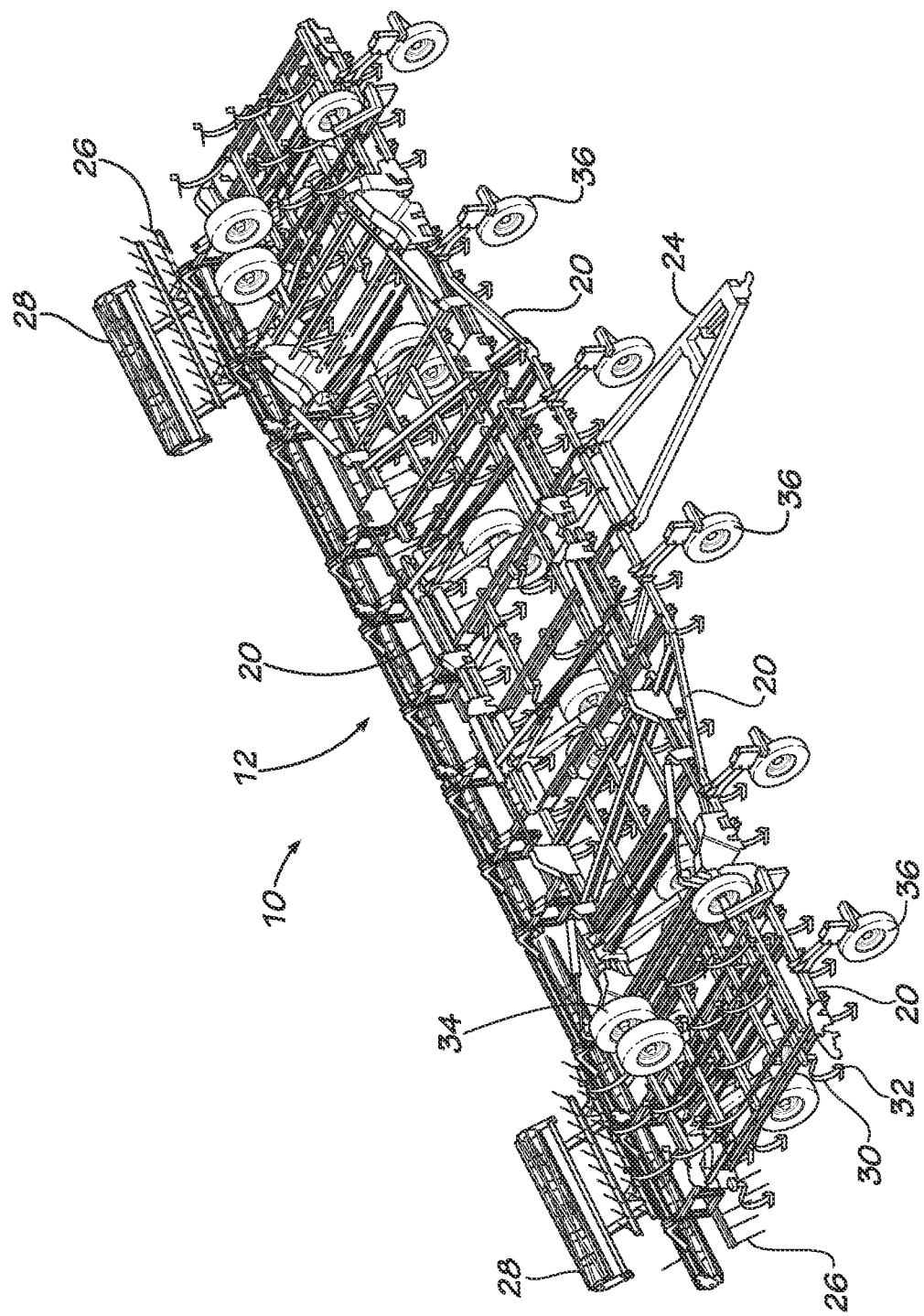
FIG. 3 is a top perspective view of the field cultivator shown in FIGS. 1-2, with the outer wing sections folded to a transport position.
Figure 4:
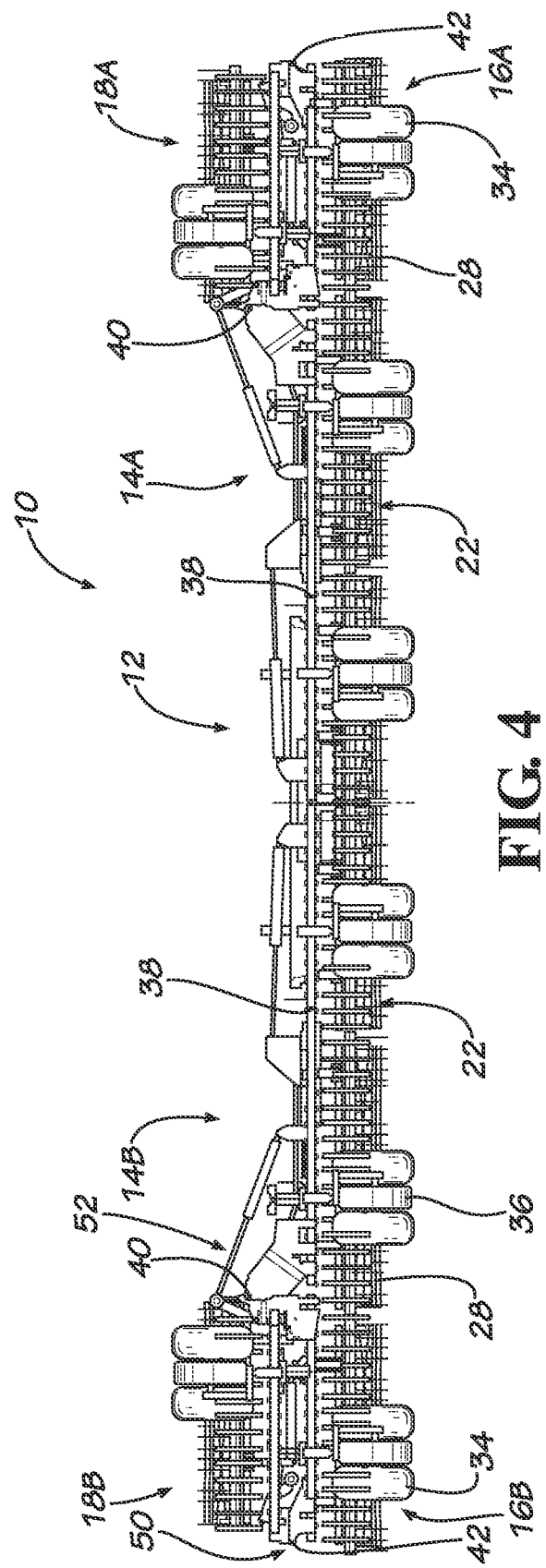
FIG. 4 is a front view of the field cultivator shown in FIG. 3, with the outer wing sections folded to the transport position.
Figure 5:
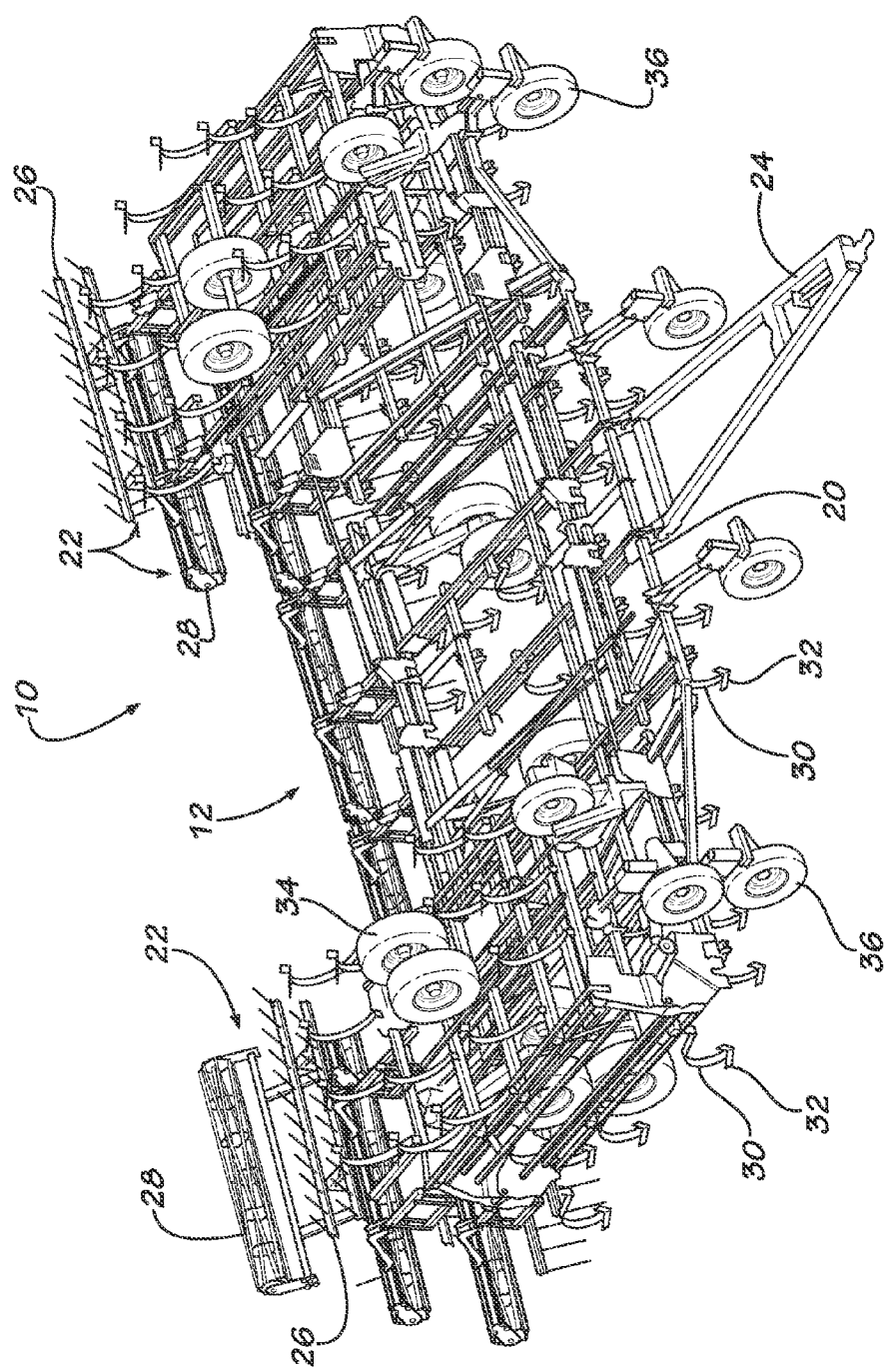
FIG. 5 is a top perspective view of the field cultivator shown in FIGS. 1-4, with the middle wing sections folded to a transport position.
Figure 6:
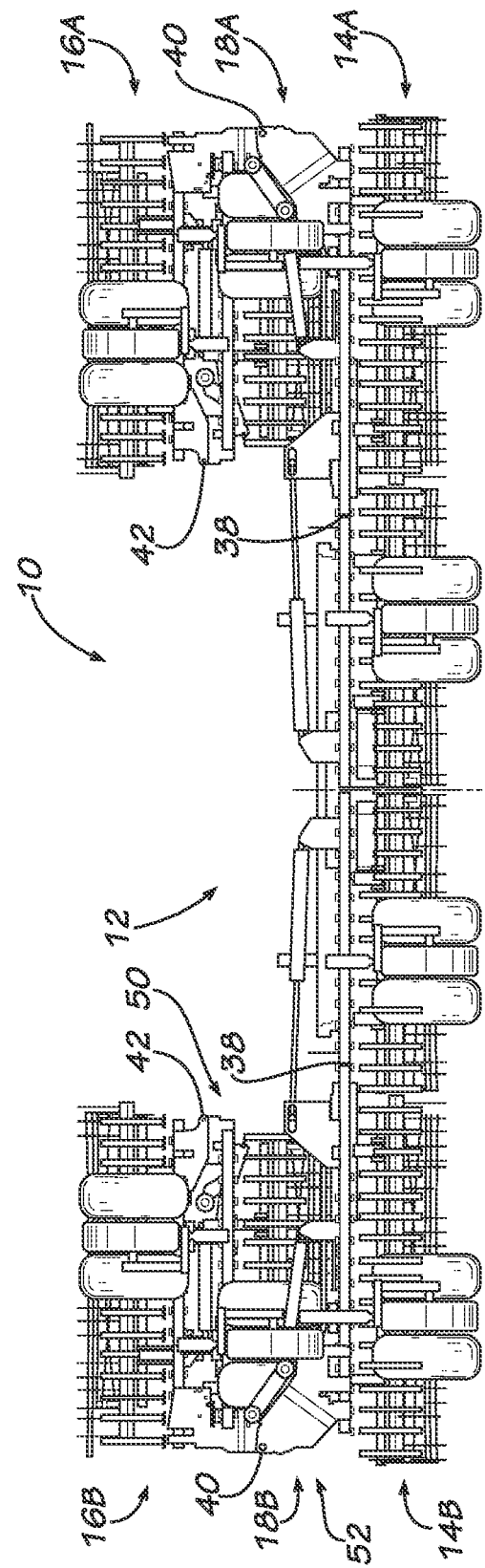
FIG. 6 is a front view of the field cultivator shown in FIG. 5, with the middle wing sections folded to the transport position.
Figure 7:
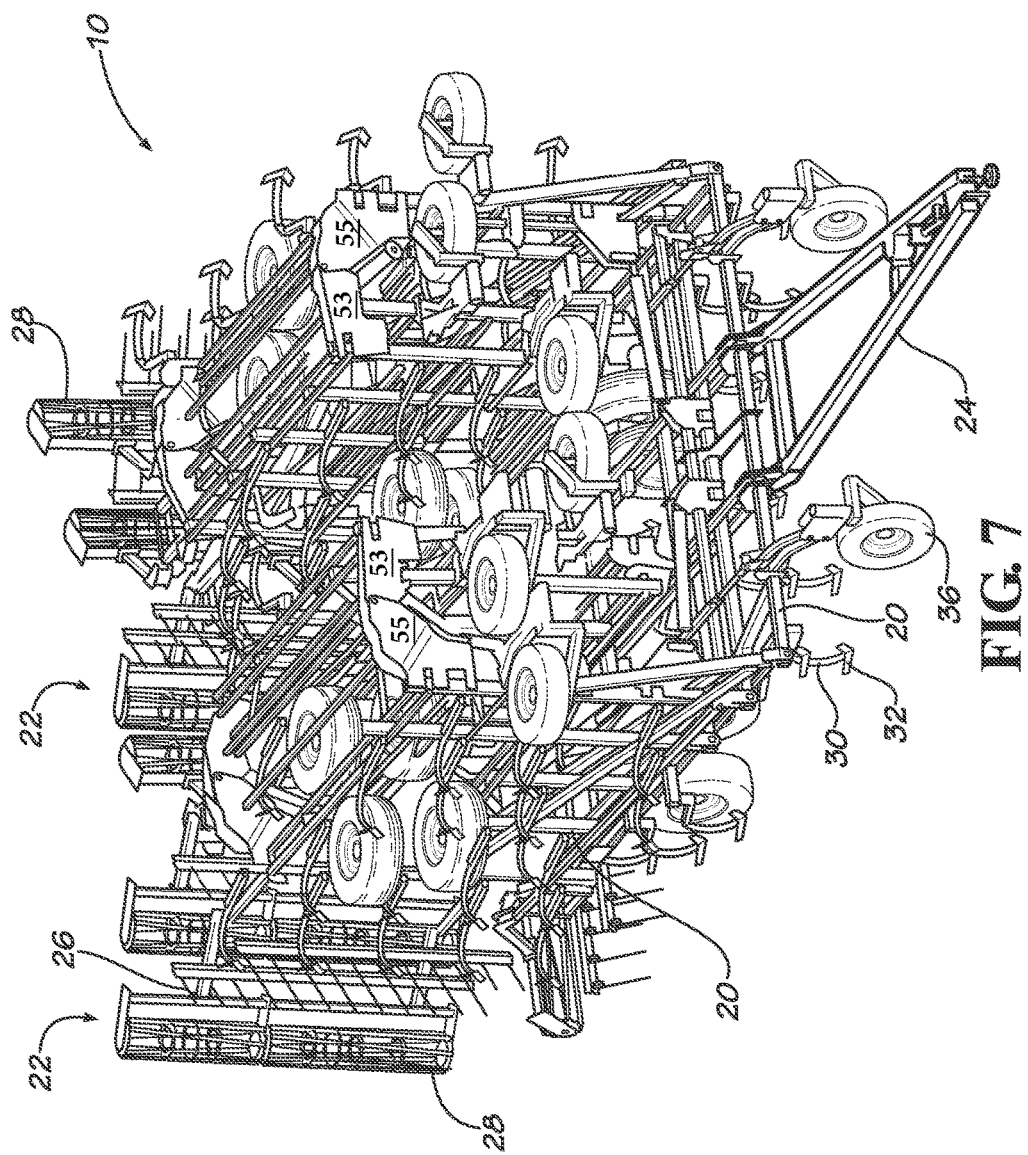
FIG. 7 is a top perspective view of the field cultivator shown in FIGS. 1-6, with the inner wing sections folded to a transport position.
Figure 8:
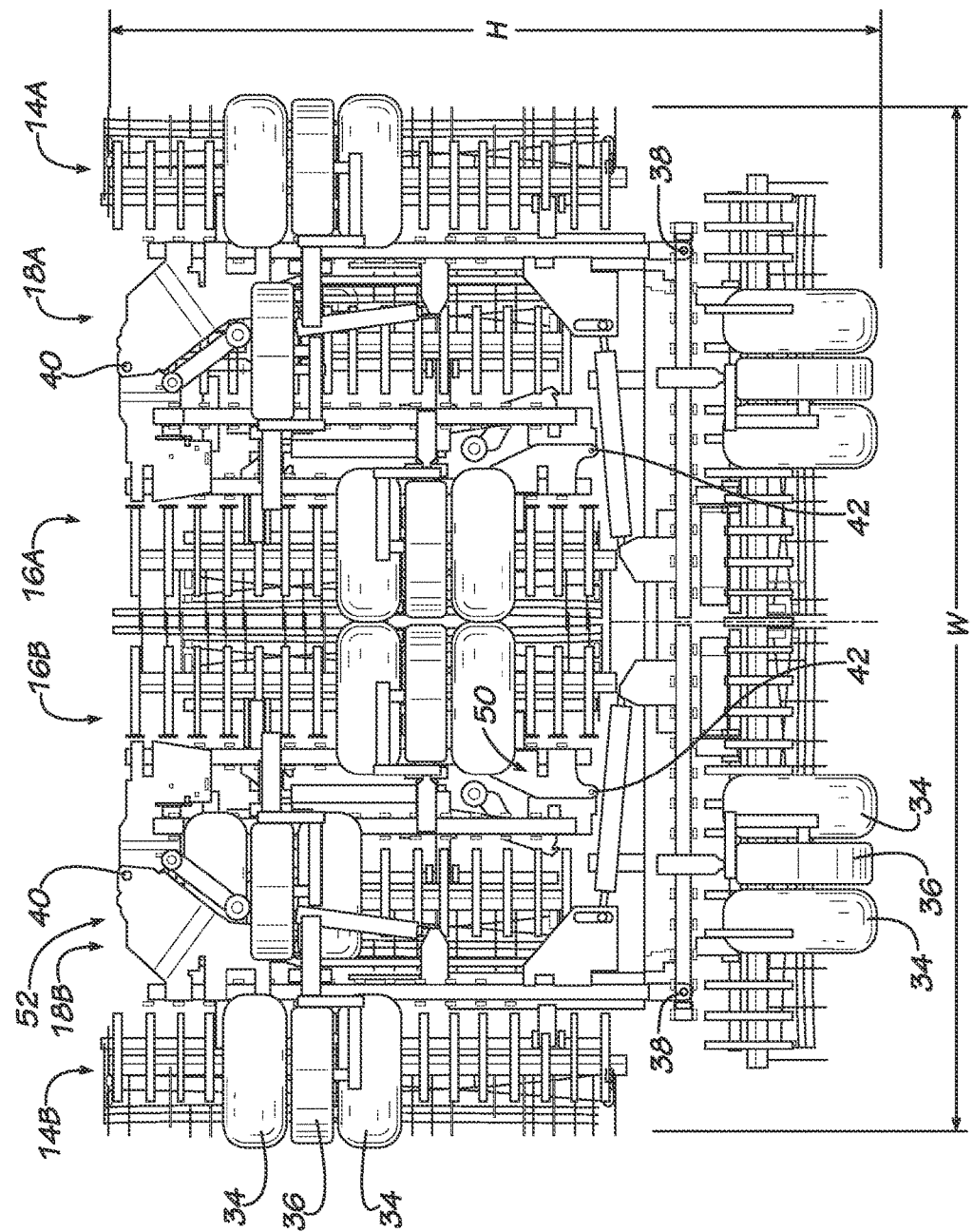
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded approximately 180° laterally inward and over a respective middle wing section 16A and 16B (FIGS. 3 and 4). With the outer wing sections 18A and 18B in the folded state, each middle wing section 16A and 16B is then folded approximately 180° laterally inward and over a respective inner wing section 14A and 14B (FIGS. 5 and 6). With the middle wing sections 16A and 16B in the folded state, each inner wing section 14A and 14B is then folded approximately 90° laterally inward and over the center frame section 12 (FIGS. 7 and 8). The outer wing sections 18, middle wing sections 16 and inner wing sections 14 thus stack together in a horizontally arranged stack over the center frame section 12 when in the folded state. That is, as best seen in FIG. 8, each of the wing sections 16, 18 and 20 are individually positioned in a generally vertical orientation, while the wings sections together are arranged in a side-by-side arrangement and define a generally horizontal stack of the wing sections. When in the folded state, the outer wing sections 18 are sandwiched between a respective middle wing section 16 and inner wing section 14. To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a horizontally arranged stack over the center frame section 12 when in the folded state (FIG. 8). To allow this type of nested stacking configuration, each of the wing sections 14, 16 and 18 have a pivot axis 38, 40 and 42 (FIG. 2), respectively, which is vertically offset to allow the wing sections to lie flat against the laterally inward shank frame 20/frame section 12 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be more strict concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably 18 feet wide, and a height "H" of no greater than approximately 14 feet, preferably 13 feet, 6 inches high (FIG. 8).

These maximum frontal profile dimensions include all of the shank frames 20, shanks 30, rear lift wheels 34 and front gauge wheels 36, when in the folded state. The shank frames 20 and plurality of shanks 30 extending downwardly therefrom define a height "H" of the shank frames 20 when in the unfolded state. When the plurality of wing sections 14, 16 and 18 lie laterally adjacent to each other in the folded state, these same heights H of the shank frames 20 define a width W of the implement 10.

The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position. In the illustrated embodiment, either prior to or during the folding sequence, each rear auxiliary implement 22 is preferably positioned at a predetermined location (e.g., fully or partially folded) so as not to interfere with folding of the respective wing section 14, 16 or 18. Similarly, either prior to or during the folding sequence, rear lift wheels 34 (and optionally front gauge wheels 36) are preferably positioned at a predetermined location (e.g., fully or partially folded) so as not to interfere with folding of the respective wing section 14, 16 or 18.

Figure 9:
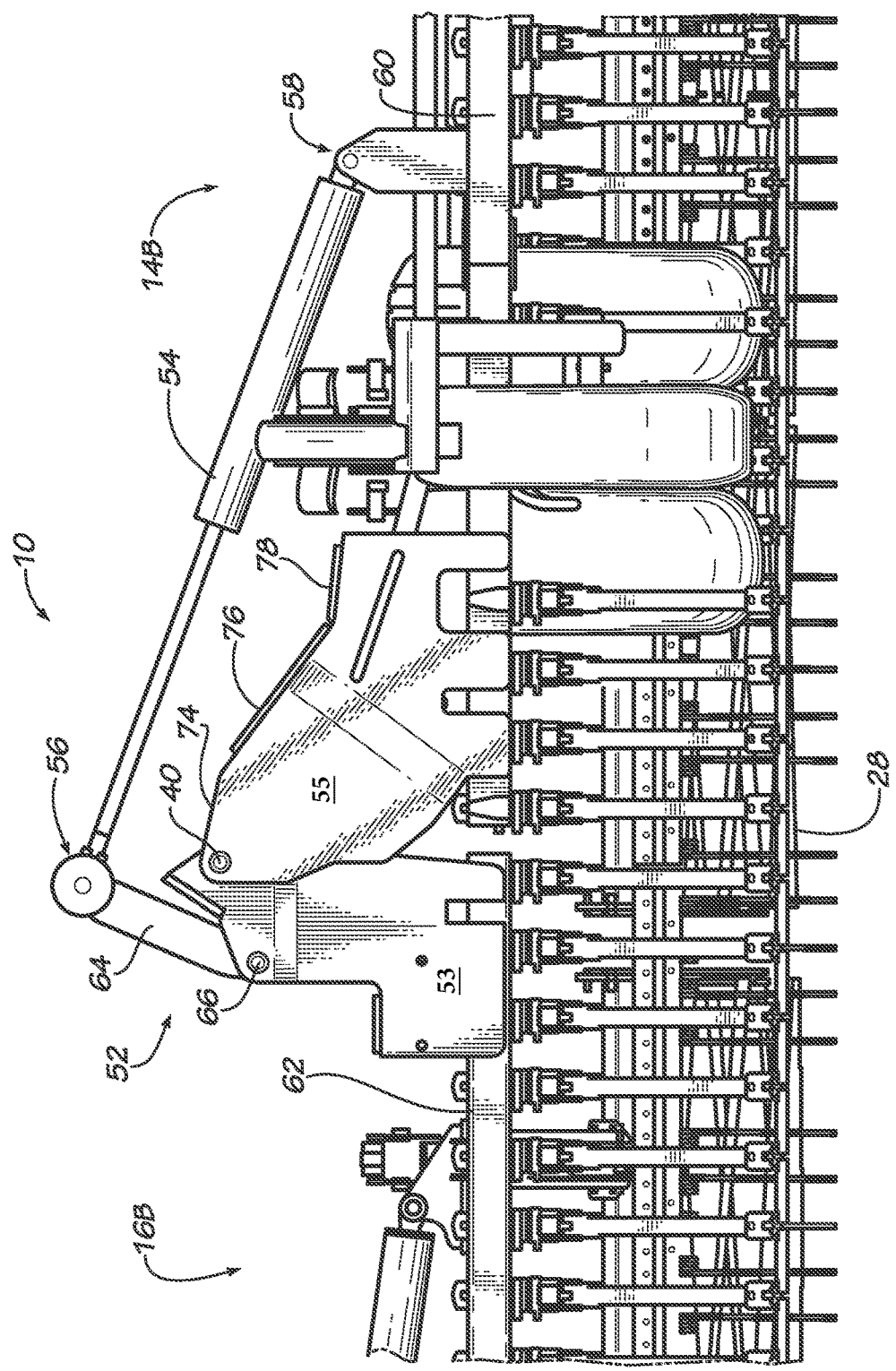
FIG. 9 is a close up view of a part of the field cultivator of FIGS. 1-8, particularly showing portions of two wing sections and a hinge system.
Figure 10:
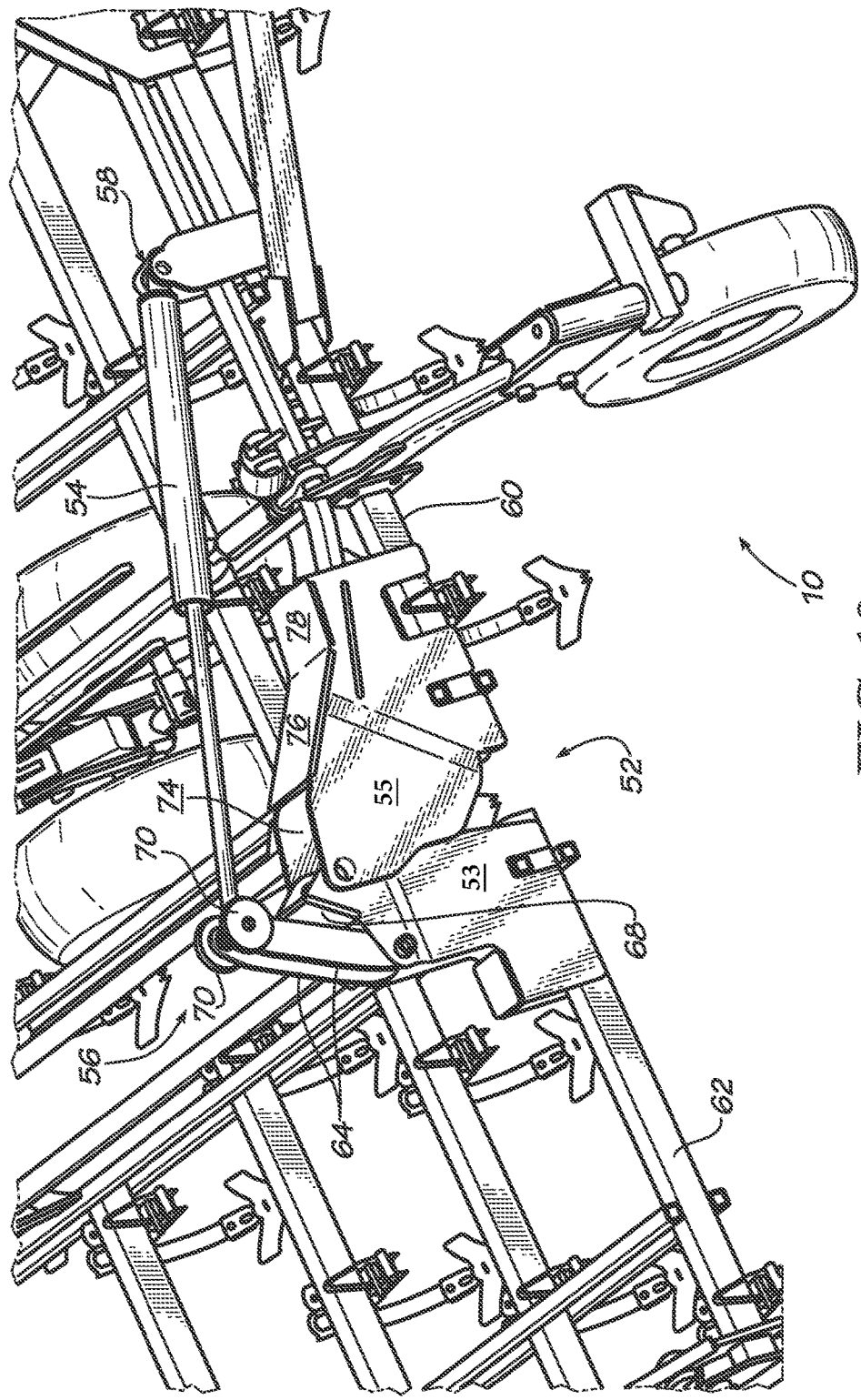
FIG. 10 is a perspective view of the hinge system of FIG. 9.

Now additionally referring to FIG. 9, there is shown a close up view of a part of implement 10, particularly showing portions of wing sections 14B and 16B. The details discussed relative to the "B" sections also apply to the "A" sections, which are a virtual mirror image of the "B" sections. There is a hinge system 50 that couple outer wing section 18B to middle wing section 16B, with hinge system 50 having a pivot axis 42. A hinge system 52 includes a middle wing section 16B including a first hinge bracket 53 and an inner wing section 14B including a second hinge bracket 55 and coupled together via a pivot axis 40 (FIGS. 7, 9 and 10). An actuator 54 having pivoting connections 56 and 58 enables middle wing section 16B to fold toward inner wing section 14B. Pivoting connection 56 is coupled to part of hinge system 52, and pivoting connection 58 is coupled to a lateral frame member 60. Pivot axis 42 is lower than pivot axis 40 when implement 10 is in an unfolded state, as shown in FIGS. 1 and 2.

Pivoting connection 56 is vertically above pivot axis 40 when implement 10 is in the operational unfolded state. As implement 10 is folded pivoting connection 56 becomes lower than pivot axis 40, so that both pivoting connection 56 and 58 are lower than pivot axis 40.

A lateral frame member 62 is illustrated as part of middle wing section 16B, with a portion of hinge system 52 being connected thereto. Lateral frame members 62 and 60, are respectively associated with middle wing section 16B and inner wing section 14B with pivot axis 40 being located above lateral frame member 60 a pivot axis height that is approximately equal to one half of a sum of a height of shanks 30 and a height of hinge system 50. An additional allowance for clearance of the structural elements and for support elements is also contemplated.

The present invention advantageously allows for the folding of implement 10 into a small enough package that it can be transported on a road without special permits. The hinge system of the present invention accommodates the tillage elements for the compact folding of implement 10.

Now additionally referring to FIG. 10, there is shown further details of hinge system 52 including a link 64 that pivots about pivot axis 66 and is attached to member 62. Hinge system 52 also includes an abutment plate 68, wheels 70, and ramps 76 and 78. Wheels 70 are rotationally coupled about a rotational axis 72 to link 64 and are shown as being coaxial with pivoting connection 56.

In the unfolded operational state of implement 10 link 64 does not generally contact abutment plate 68 and wing section 16B can pivot about pivot axis 40 to some extent as implement 10 is being used in a field. Upon folding of implement 10, as wing section 16B is folded link 64 pivots about pivot axis 66 and is drawn up against abutment plate 68 as actuator 54 retracts. Then wing section 16B is lifted as it pivots about pivot axis 40. Link 64 goes over center relative to actuator 54 and wheels 70 come into contact with a ramp system, more specifically with ramp 76, then sequentially with ramp 78 as wheels 70 traverse the ramp system as wing section 16B is folded toward wing section 14B.

The ramp system has a profile which can be made of sequentially planar elements as shown here as ramps 76 and 78, which can be described as piecewise linear or the profile of the ramp system can be continuously curvilinear. Ramps 76 and 78 may be formed of one continuous material. Wheels 70 may be coaxial with pivoting connection 56 or can be rotationally coupled to another part of link 64. Link 64 contacts abutment plate 68 for part of the transition from the unfolded state to the folded state. Once wheels 70 contact the ramps then abutment plate 68 rotates away from link 64 and into space 74 between a set of side plates as wheels 70 go down ramps 76 and 78.

When implement 10 is unfolded, and it is time for wing section 16B to unfold from wing section 14B the process described above works in reverse until wing section 16B is in its unfolded state.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A folding agricultural implement, comprising:
  a plurality of tilling sections having frame members, including a first tilling section and a second tilling section, said second tilling section being pivotally coupled to said first tilling section about a first pivot axis; and
  a hinge system coupled to both said first tilling section and said second tilling section, said hinge system including:
    a first hinge bracket coupled to the first tilling section and a second hinge bracket coupled to the second tilling section, the first hinge bracket and the second hinge bracket pivotably coupled together via the first pivot axis, wherein the first pivot axis is positioned over a portion of the first tilling section;
    a link pivotally coupled via the first hinge bracket to said first tilling section about a second pivot axis;
    an actuator having a pivoting connection on each end with one pivoting connection being coupled via the second hinge bracket to said second tilling section and the other pivoting connection being coupled to said link, said actuator having a range of travel;
    at least one wheel rotationally coupled to said link; and
    a ramp system configured for said at least one wheel to traverse thereover for a portion of said range of travel of said actuator,
    wherein the ramp system is positioned at an angle relative to a frame member of the second tilling section.

2. The folding agricultural implement of claim 1, wherein said at least one wheel is coaxial with said other pivoting connection.

3. The folding agricultural implement of claim 1, wherein the hinge system moves the first tilling section approximately 180 degrees relative to the second tilling section.

4. The folding agricultural implement of claim 1, wherein said ramp system has a profile configured to control an angular position of said first tilling section as said at least one wheel traverses said portion of said range of travel as said actuator extends or retracts.

5. The folding agricultural implement of claim 3, wherein the first hinge bracket includes an abutment plate, and the second hinge bracket is formed to include a space configured to receive the abutment plate.

6. The folding agricultural implement of claim 5, wherein when the first tilling section is pivotably moved via the hinge system relative to the second tilling section, the abutment plate of the second hinge bracket is moved into the space of the first hinge bracket.

7. The folding agricultural implement of claim 1, wherein said hinge system additionally includes an abutment plate, said abutment plate being in contact with said link over an other portion of said range of travel of said actuator.

8. The folding agricultural implement of claim 7, wherein said link and said abutment plate are generally not in contact with each other when the agricultural implement is in an unfolded operating state.

9. The folding agricultural implement of claim 7, wherein said link and said abutment plate are not in contact with each other when the agricultural implement is in a folded transport state.

10. The folding agricultural implement of claim 1, wherein said ramp system has at least two substantially planar portions.

11. A hinge system used with a folding agricultural implement, the folding agricultural implement having a plurality of tilling sections having frame members, including a first tilling section and a second tilling section, the second tilling section being pivotally coupled to the first tilling section about a first pivot axis, the hinge system being coupled to both the first tilling section and the second tilling section, the hinge system comprising:
a first hinge bracket coupled to the first tilling section and a second hinge bracket coupled to the second tilling section, the first hinge bracket and the second hinge bracket pivotably coupled together via the first pivot axis, wherein the first pivot axis is positioned over a portion of the first tilling section;
a link pivotally coupled via the first hinge bracket to the first tilling section about a second pivot axis;
an actuator having a pivoting connection on each end thereof with one pivoting connection being coupled via the second hinge bracket to the second tilling section and the other pivoting connection being coupled to said link, said actuator having a range of travel;
at least one wheel rotationally coupled to said link; and
a ramp system configured at an angle relative to a frame member of the second tilling section, the ramp system configured for said at least one wheel to traverse thereover for a portion of said range of travel of said actuator.

12. The hinge system of claim 11, wherein said at least one wheel is coaxial with said other pivoting connection.

13. The hinge system of claim 11, wherein the hinge system moves the first tilling section approximately 180 degrees relative to the second tilling section.

14. The hinge system of claim 11, wherein said ramp system has a profile configured to control an angular position of the first tilling section as said at least one wheel traverses said portion of said range of travel as said actuator extends or retracts.

15. The hinge system of claim 13, wherein the first hinge bracket includes an abutment plate, and the second hinge bracket is formed to include a space configured to receive therein the abutment plate.

16. The hinge system of claim 15, wherein when the first tilling section is pivotably moved via the hinge system relative to the second telling section, the abutment plate of the second hinge bracket is moved into the space of the first hinge bracket.

17. The hinge system of claim 11, further comprising an abutment plate, said abutment plate being in contact with said link over an other portion of said range of travel of said actuator.

18. The hinge system of claim 17, wherein said link and said abutment plate are generally not in contact with each other when the agricultural implement is in an unfolded operating state.

19. The hinge system of claim 17, wherein said link and said abutment plate are not in contact with each other when the agricultural implement is in a folded transport state.

20. The hinge system of claim 11, wherein said ramp system has at least two substantially planar portions.

* * * * *